United States Patent [19]

Chumbley

[11] 4,168,368

[45] Sep. 18, 1979

[54] POLYCARBONATES INCORPORATING 2-METHYLEPICHLOROHYDRIN

[75] Inventor: Lewis E. Chumbley, Lake Jackson, Tex.

[73] Assignee: The Dow Chemical Company, Midland, Mich.

[21] Appl. No.: 842,752

[22] Filed: Oct. 17, 1977

Related U.S. Application Data

[63] Continuation-in-part of Ser. No. 498,003, Aug. 16, 1974, abandoned.

[51] Int. Cl.$^2$ ............................................. C08G 63/62
[52] U.S. Cl. ..................................... 528/204; 528/98; 528/104; 528/106; 528/196

[58] Field of Search .............. 260/47 XA, 49; 528/98, 528/104, 109, 106, 204

[56] References Cited

U.S. PATENT DOCUMENTS

| | | | |
|---|---|---|---|
| 3,875,112 | 4/1975 | Bockmann et al. | 260/47 XA |
| 3,992,357 | 11/1976 | Constien | 260/47 XA |

*Primary Examiner*—Wilbert J. Briggs, Sr.
*Attorney, Agent, or Firm*—B. G. Colley

[57] ABSTRACT

A thermoplastic polycarbonate formed by reacting a carbonyl halide such as phosgene, a dihydric phenol, and a 2-methylepichlorohydrin residue-dihydric phenol prepolymer under polycarbonate forming conditions.

6 Claims, No Drawings

POLYCARBONATES INCORPORATING 2-METHYLEPICHLOROHYDRIN

CROSS REFERENCE TO RELATED APPLICATION

This is a continuation-in-part of Ser. No. 498,003 filed Aug. 16, 1974 now abandoned.

BACKGROUND OF THE INVENTION

This invention relates to copolycarbonates having a 2-methylepichlorohydrin residue incorporated therein.

It is known from U.S. Pat. Nos. 3,136,741 and 3,161,615 to make polycarbonate copolymers by reacting 4,4'-dihydroxy diphenyl methanes with phosgene and various glycols such as ethylene glycol, butane glycol, and hexane glycol.

It is also known from U.S. Pat. No. 3,220,973 to use glycerine, trimethylolpropane, pentaerythritol, etc. in place of the above glycols to prepare crosslinked polycarbonates.

It is also known from Ser. No. 374,858 filed June 29, 1973 now abandoned in favor of Ser. No. 638,393, filed Dec. 8, 1975 that copolycarbonates can be prepared having an epihalohydrin residue incorporated therein, however, these have the disadvantage that they crosslink upon heating to about 240° C. and thus cannot be used in a standard molding apparatus.

It is also known from U.S. Pat. No. 3,875,112 (Bockmann) that low molecular weight copolycarbonates can be prepared by reacting bisphenol A, the glycerine bis ether of bisphenol-A, and phosgene under polycarbonate forming conditions. These low molecular weight polycarbonates have active hydroxyl functionalities and it is taught that they can be used as prepolymers for further reaction to form urethane/polycarbonates, polyester polycarbonates, etc. The high molecular weight polycarbonates containing epihalohydrin residues as taught in Ser. No. 374,058 (above) would have identical functional groups. It has been shown that these polymers crosslink at temperatures above about 250° C. and cannot be used in standard molding apparatus.

It is further known from U.S. Pat. No. 3,992,357 that copoly-carbonates can be made having a residue of di(2-methyl glycidyl) ether of Bis A incorporated therein; however, these copolymers degrade and discolor under certain molding conditions and could not be used to prepare clear plastic articles.

SUMMARY OF THE INVENTION

It now has been discovered that random copoly-carbonates can be prepared from a dihydric phenol, a carbonyl halide, and a 2-methylepichlorohydrin-dihydric phenol precursor and these copolycarbonates are similar in physical properties to the known bisphenol polycarbonates, i.e. the homopolycarbonates of U.S. Pat. No. 3,028,365, but the present polycarbonates are superior in that they have a lower melt rheology and a higher stress crack resistance.

The present invention is broadly the linear thermoplastic polycarbonate which comprises the reaction product under polycarbonate forming conditions of a carbonyl halide, a dihydric phenol and a polyhydroxy compound or prepolymer of the formula

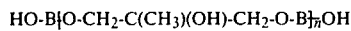

wherein B is the divalent residue from a dihydric phenol and n is a whole number from 1 to 5.

A preferred aspect of the present invention is a random polycarbonate having a range from about 1 to about 50 mole percent of the above prepolymer units connected by carbonate linkages with about 50 to about 99 mole percent of the above dihydric compound, with a preferred range being from 2.5 to 20 mole percent prepolymer and from 80 to 97.5 mole percent dihydric phenol.

A more preferred aspect of the present invention is a polycarbonate which is the reaction product under polycarbonate forming conditions of phosgene, a dihydroxy compound of the formula HO-B-OH and a polyhydroxy compound or prepolymer of the formula

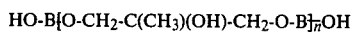

wherein B is the divalent group

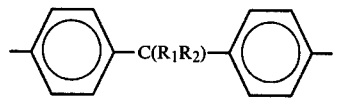

and $R_1$ and $R_2$ are independently hydrogen and lower alkyls such as methyl, ethyl, propyl, butyl and n is a whole number from one to five.

The process by which the polycarbonates of this invention are prepared consists of forming a prepolymer from one mole of a dihydric phenol with about 0.02 to about 0.5 moles of 2-methylepihalohydrin or 1,3-dihalo-2-methyl propanol. This prepolymer is then reacted with additional amounts of the same or a different dihydric phenol and a carbonyl halide under polycarbonate forming conditions such as interfacial polycondensation or transesterification to produce a linear thermoplastic polycarbonate.

These polycarbonate resins are useful in that they can be injection molded and extruded into useful objects, both clear and pigmented, by conventional methods at lower temperatures and pressures compared to the homopolycarbonate of bisphenol A. A further advantage of this invention is that the lower melt viscosity enables the complete filling of smaller mold cavities, thus, delicate articles can be easily fabricated. Conversely, larger articles can be fabricated at higher speeds.

The resins of this invention have a weight average molecular weight greater than about 20,000 and in the range from about 22,000 to about 65,000 as measured by gel permeation chromatography. The preferred range is from about 28,000 to about 40,000.

DETAILED DESCRIPTION

The polycarbonates produced in this invention are produced by first reacting and stirring a dihydric phenol compound such as bisphenol A with an aqueous caustic solution made from sodium or potassium hydroxide having a pH greater than 10 (preferably in the pH range of 10–11) at a temperature in the range from about 10° C. to about 60° C. and preferably about 50° to 55° C. for a period of time ranging from about 0.1 to about 3.0 hours and preferably from about 10 to about 15 minutes. For good color in the resulting polycarbonate, an inert atmosphere such as nitrogen, helium, argon, methane, and the like is preferably used.

Following this a 2-methyl hydroxyl type compound such as 2-methyl epichlorohydrin, 1,3-dichloro-2-methyl-2-propanol and the like is added in an amount from 0.01 to 0.50 and preferably from 0.02 to 0.3 per mole of dihydric phenol with continued stirring and allowed to react for a period of time from about 10 to about 600 minutes at the same temperature to form a 2-methyl hydroxyl type adduct.

In order to control the molecular weight of the polycarbonate which is to be formed, about 1.5 to 5.0 grams of a chain stopper such as phenol or an alkylated phenol per mole of diphenol compound is added to the reactants at this point and reacted for about 1.0 to about 60 minutes at about 15° to about 50° C. in order to form the sodium salt thereof.

An inert halogenated solvent such as methylene chloride, and the like is then added to the reactants in an amount from about 5.5 to about 10.0 moles and stirred for about 15 to about 45 minutes at about 15° to about 40° C.

Then 1.0 to 1.3 moles of a carbonyl halide based on the total moles of dihydric phenol and 2-methyl glycerol type adduct, are bubbled into the reactants at a rate of 0.5 to 20.0 grams per minute and the reaction temperature is maintained in the range from about 20° C. to about 40° C. by a cold water bath.

Additional caustic is added periodically during the phosgenation reaction to keep the pH in excess of pH 10.0.

After the addition of the phosgene is complete, a catalytic quantity, i.e. 0.5 to 5.0 weight percent, based on the dihydric phenol of a quaternary amine or a tertiary amine catalyst is added to the reactants. Suitable catalysts are triethylamine, N,N-dimethylcyclohexylamine, tetramethyl ammonium hydroxide, triethyl benzyl ammonium hydroxide, benzyl trimethyl ammonium chloride, and the like. The catalyzed reactants are stirred and allowed to react for about 0.25 to about 3 hours at a temperature of about 20° to about 40° C.

The recovery of the polycarbonate is accomplished by decanting the aqueous layer, treating and remaining halogenated solvent with a strong aqueous acid solution (pH 1-3) such as hydrochloric or sulfuric acid solutions, to neutralize the NaOH or KOH and washing with distilled water.

Finally, the polymer is precipitated from the solvent solution by pouring it into an excess of a non-solvent for the polymer such as hexane, ethanol, petroleum ether, etc. The white precipitated polymer is then filtered, water washed and dried in a vacuum.

The dihydric phenols employed in the practice of this invention are known dihydric phenols in which the sole reactive groups are the two phenolic hydroxyl groups. Some of these are represented by the general formula

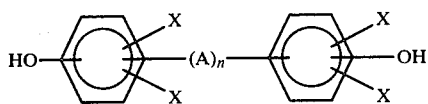

wherein A is a divalent hydrocarbon radical containing 1-15 carbon atoms, —S—, —S—S—,

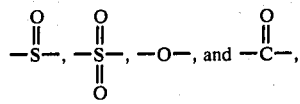

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons and an oxyaryl group of 6-8 carbons and n is 0 or 1.

One group of suitable dihydric phenols are those illustrated below:
1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)pentane
2,2-bis(3,5-difluoro-4-hydroxyphenyl)butane
2,2-bis(4-hydroxyphenyl)propane (Bis A)
1,1-bis(3-methyl-4-hydroxyphenyl)ethane Another group of dihydric phenols useful in the practice of the present invention include the dihydroxyl diphenyl sulfoxides such as for example;
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric phenols which may be used in the practice of the invention includes the dihydroxaryl sulfones such as, for example:
bis(3,5-diisopropyl-4-hydroxyphenyl)sulfone
bis(3-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dibromo-4-hydroxyphenyl)sulfone
bis(3-methyl-4-hydroxyphenyl)sulfone
bis(4-hydroxyphenyl)sulfone Another group of dihydric phenols useful in the practice of the invention includes the dihydroxydiphenyls:
3,3',5,5'-tetrabromo-4,4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl Another group of dihydric phenols which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether
bis(4-hydroxyphenyl)ether.

A further group of dihydric phenols outside the scope of the above generic formula which may be used in the practice of the invention includes the dihydroxy benzenes, and the halo- and alkyl-substituted dihydroxy benzenes, such as, for example, resorcinol, hydroquinone, 1,4-dihydroxy-2-chlorobenzene, 1,4-dihydroxy-2-bromobenzene, 1,4-dihyroxy-2,3-dichlorobenzene, 1,4-dihydroxy-2-methylbenzene, 1,4-dihydroxy-2,3-dimethylbenzene, 1,4-dihydroxy-2-bromo-3-propylbenzene.

Other dihydric phenols of interest include the phthalein type bisphenols which are disclosed in U.S. Pat. Nos. 3,035,021; 3,036,036; 3,036,037; 3,036,038; 3,036,039.

It is, of course, possible to employ a mixture of two or more different dihydric phenols in preparing the thermoplastic carbonate polymers of the invention.

The carbonate precursor employed in the process of this invention to prepare the linear thermoplastic polycarbonates is one of the carbonyl halides. Examples of the carbonyl halides are carbonyl bromide, carbonyl chloride and carbonyl fluoride.

The following examples are presented to further illustrate but not limit the invention.

EXAMPLE 1

To a 3.0 liter flask equipped with stirrer, gas inlet tube, thermometer, and reflux condenser was added 228 grams (1.0 mole) of parabisphenol A, 0.23 grams of sodium sulfite, 683 grams of distilled water, and 214 grams of 37% caustic. The system was purged with nitrogen for 15 minutes, then heated to 55° C. At this time, 5.48 grams of 2-methylepichlorohydrin was added and, with continued stirring, allowed to react for thirty minutes. After this digestion, 4.0 g. of p-tert-butylphenol, 54.1 g. of 37% NaOH, and 21 g. distilled water were added. The reactants were cooled to 30° C. and 792 g of methylene chloride was added. Using a cold water bath to maintain the temperature at 29°–33° C., 118 g. of gaseous phosgene was introduced at a rate of about 2.5 g/min. The reactants were kept strongly alkaline during phosgenation by adding additional caustic, 26 g. of 37% sodium hydroxide after 34 g. and 55 g. phosgene had been added. Immediately after completion of phosgenation, 1.5 ml. of triethylamine was added. Temperature was maintained at 30°–32° C. for 1½ hours while the reactants were stirred and allowed to digest. The salt water and excess caustic solution were decanted leaving a solution of the copolycarbonate in methylene chloride. This was acidified with 1:1 HCl, washed with 2% sodium bicarbonate solution, and with distilled water. Trichloroethylene was added to the polymer solution, methylene chloride was removed by distillation, and the polymer was precipitated with isooctane.

The powdered copolycarbonate, melting point 228°–232° C., gave a weight average molecular weight of 34,174 by gel permeation chromatography. It was molded in a hand press at 254° C. to give a very tough, transparent plastic. Both infrared and NMR spectra were consistent with a random copolycarbonate of bisphenol A and the 2-methylepichlorohydrin-bisphenol A adduct, the latter being present at 4.5–5.5 mole percent.

Injection molding evaluation of the above copolycarbonate was made using a Newbury Model H130RS injection molding mahcine, producing 6 inch test bars. For comparative purposes, the homopolycarbonate of bisphenol A (Lexan 101 ®) was also molded. The two polymers molded under essentially the same conditions of temperature and pressure.

The 6 inch test bars from the moldings above were used for physical property evaluation. Tensile properties, heat deflection, and notched Izod impact were determined. Values are given in Table I.

TABLE I

| Property | Lexan 101 ® | Example 1 Copolycarbonate |
| --- | --- | --- |
| Yield tensile strength (psi) (ASTM D-638) | 8,900 | 8,700 |
| Yield elongation (%) (ASTM D-638) | 6.1 | 5.9 |
| Izod impact strength at 73° C. (ft. lbs. beta in. of notch) (ASTM D-256) | 17.0 | 18.0 |
| Heat distortion, 264 psi (ASTM D-648) Unannealed, °F. | 248 | 254 |
| Annealed, °F. | 298 | 293 |

EXAMPLE 2

Stress crack resistance of the copolycarbonate of Example 1 was determined by the procedure outlined below. For comparative purposes, homopolycarbonate of bisphenol A (Lexan 101 ®) was also evaluated.

The polymer samples were injection molded, ⅛ inch thick discs, cut to 1⅜ inch OD by ⅜ inch ID. These discs were attached to a ⅛ inch stainless steel plate with standard ⅜ inch by 1 inch stainless machine bolts using standard ⅜ inch washers (1 inch OD by ⅜ inch ID) and nuts.

Stress was applied to the discs by tightening the nuts with a torque wrench to 40 ft.-lbs and 20 ft.-lbs. Stress on the discs was calculated to be 1000 spi and 500 psi, respectively.

The discs under stress were then placed in an oven at 100° C. and observed for stress crack failure. Data given below in Table II is the time required for stress cracks.

TABLE II

| | Time to Failure in Hours | |
| --- | --- | --- |
| Sample | 100° C. and 1000 psi | 100° C. and 500 psi |
| Example 1 copolycarbonate | 16 | >120 |
| Lexan 101 ® | 1 | 43 |

EXAMPLES 3 and 4

The copolycarbonates of Examples 3 and 4 were prepared essentially by the procedure of Example 1. Reactant charges were as follows:

TABLE III

| Reactant | Example 3 Copolycarbonate | Example 4 Copolycarbonate |
| --- | --- | --- |
| 2-Methylepichlorohydrin | 10.9 g (0.1 mole) | 21.6 g (0.203 mole) |
| Bisphenol A | 228 g (1.0 mole) | 228 g (1.0 mole) |
| Caustic (34.5%) | 336.5 g | 386.2 g |
| Distilled water | 674 g | 682 g |
| Sodium sulfite | 0 | 0.23 g |
| p-Tert-butylphenol | 4.0 g | 3.2 g |
| Methylene chloride | 792 g | 792 g |
| Phosgene | 112 g | 118 g |
| Triethylamine | 1.1 g | 1.1 g |

The resulting copolycarbonates were compression molded in a hand press at 254° C. (489° F.) to give tough, transparent plastics with properties given in Table IV.

TABLE IV

|  | Lexan 101® Homopoly-Carbonate | Example 3 11 mole % 2 MEA Copoly-Carbonate | Example 4 25 mole % 2 MEA Copoly-Carbonate |
|---|---|---|---|
| Yield tensile, psi | 8040 | 8115 | 8440 |
| Elongation, % (ultimate) | 40 | 25 | 15 |
| Melting Point, °C. | 232–235 | 223–226 | 206–212 |
| Wt. Ave. mol. weight | 30,000 | 38,378 | 42,039 |

TABLE V
Melt Rheology

| Shear Rate (sec$^{-1}$) | Lexan 101 | Example 3 | Example 4 |
|---|---|---|---|
| 2.99 | 1.78 | 1.36 | 1.46 |
| 7.48 | 1.80 | 1.40 | 1.26 |
| 14.97 | 1.89 | 1.45 | 1.10 |
| 29.93 | 2.13 | 1.5 | 0.88 |
| 74.83 | 3.15 | 1.6 | 0.79 |
| 149.7 | N.A. | N.A. | 0.78 |
| 299.3 | N.A. | N.A. | 0.95 |

Table V shows that as the shear rate increases the apparent viscosity of Examples 3 and 4 decreased whereas the Lexan control had an increase in viscosity. This is indicative of the fact that copolycarbonates similar to Examples 3 and 4 would permit molding at lower temperatures and pressures. Also this indicates that smaller articles or articles with more delicate components could also be molded since smaller mold cavities could be filled with the lower viscosity molten polycarbonate of this invention.

Controls 1 and 2

The polycarbonates of controls 1 and 2 were prepared in a 100 gallon glass lined, stirred reactor by essentially the procedure of Example 1. Reactant charges were as follows:

| Reactant | Control 1 Polycarbonate | Control 2 Copolycarbonate |
|---|---|---|
| Bisphenol A | 48.4 lbs (21.97 kg) (96.25 moles) | 48.4 lbs. (21.97 kg) |
| Epichlorohydrin | 0 | 1.057 lbs (480 g) (5.19 moles) |
| Caustic Soda (Bead) | 25.5 lbs. | 25.5 lbs. |
| Distilled Water | 198 lbs. | 198 lbs. |
| Sodium Sulfite | 0.05 lbs. | .05 lbs. |
| p-tert. butyl phenol | 0.847 lbs. | 0.846 lbs. |
| Methylene Chloride | 161 lbs. | 161 lbs. |
| Triethylamine | 0.233 lbs. | 0.233 lbs. |

The polycarbonates of Example 1, and Controls 1 and 2 were evaluated for heat stability by an extrusion plastometer (Melt Index) using the equipment and procedures outlined in ASTM D-1238. Temperature was 270° C., weight 3137 g.

The results were as follows:

TABLE VI

| Polymer | | Melt Flow (g/10 min.) |
|---|---|---|
| Example 1 | (5.7M% Methyl Epi Copolycarbonate) | 14.1 |
| Control 1 | (Bis-A homopolycarbonate) | 9.6 |
| Control 2 | (5.7M% Epi Copolycarbonate) | −0* |

*Would not extrude - Polymer set up to an insoluble mass in the melt indexer during the 8 minute preheat.

Additionally, it was impossible to obtain shear rate vs. viscosity data (Table V) for the polycarbonate of Control 2 because the polymer set up in the rheometer when heated to 270° C. and it would not extrude.

What I claim is:

1. A linear thermoplastic polycarbonate having a weight average molecular weight in the range from about 22,000 to about 65,000 which comprises a reaction product under polycarbonate forming conditions of
   (1) a carbonyl halide,
   (2) a dihydric phenol, and
   (3) a prepolymer having the formula HO—B—O—CH$_2$—C(CH$_3$)(OH)—CH$_2$—O—B—OH
   wherein B is the divalent residue from a dihydric phenol.

2. The polycarbonate of claim 1 wherein the prepolymer comprises 1–50 mole percent of the polycarbonate.

3. The polycarbonate of claim 1 wherein the prepolymer comprises 2.5–20 mole percent of the polycarbonate.

4. The polycarbonate of claim 1 wherein the dihydric phenol has the formula

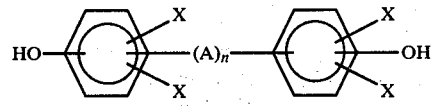

wherein A is a divalent hydrocarbon radical containing 1–8 carbon atoms, —S—, —S—S—

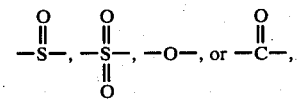

X is independently hydrogen, chlorine, bromine, fluorine, or a monovalent hydrocarbon radical such as an alkyl group of 1–4 carbons, an aryl group of 6–8 carbons, an oxyalkyl group of 1–4 carbons or an oxyaryl group of 6–8 carbons and n is 0 or 1.

5. The polycarbonate of claim 1 wherein the dihydric phenol has the formula

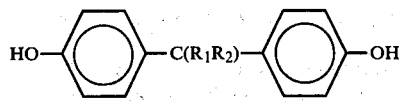

and the divalent residue B has the formula

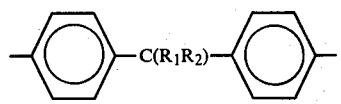

wherein R$_1$ and R$_2$ are independently hydrogen and lower alkyl groups of 1–4 carbons.

6. The polycarbonate of claim 5 wherein R$_1$ and R$_2$ are methyl groups in the dihydric phenol and in the divalent residue B.

* * * * *

UNITED STATES PATENT AND TRADEMARK OFFICE
CERTIFICATE OF CORRECTION

PATENT NO. : 4,168,368
DATED : September 18, 1979
INVENTOR(S) : Lewis E. Chumbley It is certified that error appears in the above–identified patent and that said Letters Patent are hereby corrected as shown below:

Column 5, line 64; change "mahcine," to --machine,--.

Column 7, Table V; please correct as:

TABLE V

Melt Rheology

| Shear Rate $(sec^{-1})$ | Apparent Viscosity at 270°C (poise x 10,000) | | |
|---|---|---|---|
| | Lexan 101 | Example 3 | Example 4 |

Column 8, line 65; change "$R_1$ and R" to --$R_1$ and $R_2$--.

Signed and Sealed this

Fifteenth Day of January 1980

[SEAL]

Attest:

SIDNEY A. DIAMOND

Attesting Officer    Commissioner of Patents and Trademarks